2 Sheets--Sheet 1.

H. WYMAN.

Shuttle-Box Mechanism for Looms.

No. 6,567. Reissued July 27, 1875.

Witnesses:
M. Gardner.
R. F. Halleck

Inventor:
George Crompton
Assee Horace Wyman
per Lemuel Gregory
Atty

2 Sheets--Sheet 2.

H. WYMAN.

Shuttle-Box Mechanism for Looms.

No. 6,567. Reissued July 27, 1875.

Witnesses:
M. Gardner.
M. F. Halleck

Inventor:
George Crompton
Assee Horace Wyman
per Crosby Gregory

UNITED STATES PATENT OFFICE.

HORACE WYMAN, OF WORCESTER, MASS., ASSIGNOR TO GEORGE CROMPTON.

IMPROVEMENT IN SHUTTLE-BOX MECHANISMS FOR LOOMS.

Specification forming part of Letters Patent No. 70,309, dated October 29, 1867; reissue No. 6,567, dated July 27, 1875; application filed July 20, 1875.

*To all whom it may concern:*

Be it known that I, HORACE WYMAN, of the city and county of Worcester, in the State of Massachusetts, have invented certain new and useful Improvements in Drop-Box or Shuttle-Changing Apparatus of Looms; and that the following, taken in connection with the drawings, is a full, clear, and exact description thereof.

Figure 1:
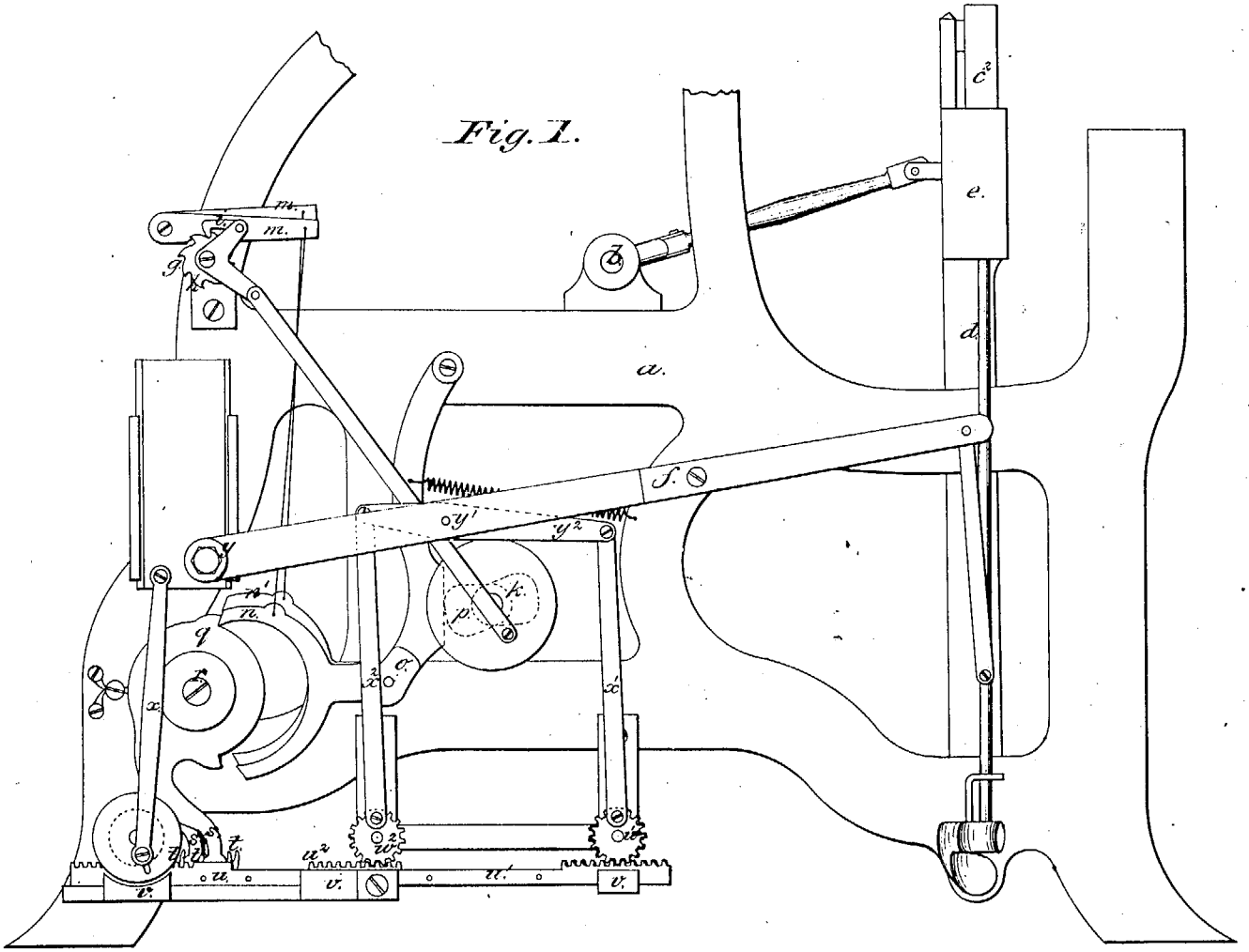
Figure 3:
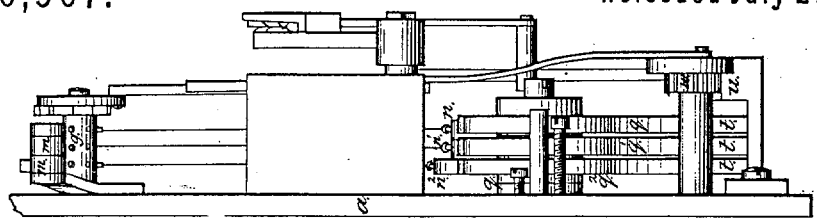
Figure 2:
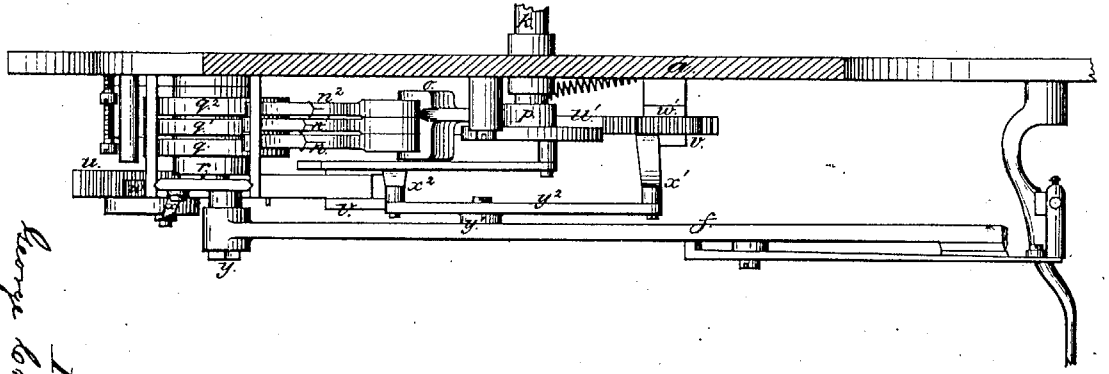

In the drawings, Figure 1 is a side elevation of parts of a loom, exhibiting my invention. Fig. 2 is a horizontal section through the same; and Fig. 3 is a rear elevation thereof.

My invention will be described under two heads. First, the shuttle-changing apparatus proper; second, a contrivance for obviating breakage of the parts, which is applicable to any shuttle-changing mechanism.

My invention, under the first head, is dependent upon the use of a lever or levers with shifting or movable fulcrums, or of a compound lever; and by a lever with shifting-fulcrums I mean a lever provided with mechanisms for oscillating it connected to two different points on the lever, while the motion to perform the work is derived from a third point on the lever; and by a compound lever I mean one lever pivoted upon another, each of the two having mechanism for oscillating them, and the motion to perform the work being derived from some point in either lever which is different from those to which the oscillating mechanism is applied. The compound lever comes within the description of a lever with shifting-fulcrums, and is one way of constructing such a lever. Such levers are not new as applied to shuttle-box mechanism, and may be seen described in English and American Letters Patent prior to the date of my invention. My invention is, therefore, limited to certain mechanical devices in combination with such a lever or levers.

In the form of my apparatus shown in the drawings it is capable of changing or shifting a set of six boxes; of locating and holding any one of six boxes in line with the race; but it may be used for four boxes, or may be made capable of shifting eight boxes.

In the drawings is represented a long lever, *f*, pivoted at *y* on a sliding block, and connected at one end by the usual link to an ordinary sliding rod, *d*, which, at its upper end, is fastened to the lower of the tier of shuttle-boxes $c^2$, which, as usual, slide in ways or a frame, *e*; consequently the boxes move when the end of the lever *f* moves.

This lever *f* has pivoted upon it at $y^1$ another lever, $y^2$, and the pivot of the long lever *f*, at *y*, and the two ends of the lever $y^2$, have secured to each of them (in the first case through the intervention of the sliding block) a connecting-rod, the three rods being shown at $x$ $x^1$ $x^2$, but all the rods may be secured indirectly to the levers. The lower end of each of these connecting-rods is actuated by a crank-pin mounted on a shaft provided with a toothed wheel, the wheels being shown at $w$ $w^1$ $w^2$, and these wheels can be turned through half a revolution, first in one direction, then in the other, by racks or toothed surfaces $u$ $u^1$ $u^2$ attached to bars sliding in guides $v$ $v^1$ $v^2$. Each of these bars is provided with two studs, *t*, at the end farthest from the racks. These bars and racks lie side by side, and two of the connecting-rods are bent, if necessary, so that neither the racks, toothed wheels, or levers may interfere in performing their proper functions. A series of three rocking arms, $q$ $q^1$ $q^2$, each provided with ratchet-teeth and prolonged downward, as at *s*, is mounted upon a stationary shaft, *r*, in such wise that each arm can be moved independently. Each of these downward prolongations enters between the studs *t* of the corresponding rack-bar, or is jointed to such bar. These ratcheted rocking arms are shown in the drawings as actuated by pawls $n$ $n^1$ $n^2$, pivoted on a swinging arm at *o*, and worked by tappets *p* on the cam-shaft *k*, their operation being directed by a pattern chain or mechanism, through the intervention of levers $m$ $m^1$ $m^2$ attached to the pawls by wires or rods, all the parts enumerated in this sentence being of usual, ordinary, and well-known construction.

Each crank-pin can revolve from the upper center to the lower one independent of the motion of any other pin in the set, and when a pawl rocks a rocking arm the latter slides a racked bar, and the racked bar, through a toothed wheel, turns a crank-pin, and this pin, through the intervention of a connecting-rod, shifts a lever.

Under this construction of parts, the end of

BEST AVAILABLE COPY the lever $f$ which actuates the boxes may occupy and be held in six different positions, it being clear that the pivot $y^1$, which is one shifting-fulcrum of lever $f$, may be held in four different positions by means of the crank-pins acting through the connecting-rods on the two ends of lever $y^2$, viz, one with both pins down, a second with both pins up, a third with one pin, $w^2$, up, and the other, $w^1$, down, and a fourth when $w^1$ is up and $w^2$ down, thus holding the end of lever $f$ in four different positions, supposing the pivot $y$ to be stationary, while when $y$ is moved, then six different positions can be given to the end of lever $f$.

With the combination of levers as shown, therefore, eight boxes may be used by giving the pin $y$ a greater extent of movement than shown in the drawings, and properly adapting the pattern-chain to govern its movements. If four boxes only are to be used, the pivot $y$ may be kept stationary, or one of the racks, $w^2$, which operate the ends of lever $y^2$, be kept stationary. When one rack is kept stationary the lever $y^2$ will have a fixed fulcrum at one end, and be capable of holding the fulcrum $y^1$ of the long lever in two positions only. For more boxes the lever $f$ may be still further compounded and combined with other slide-racks.

Instead of connecting the end of the long lever directly to the link, which, at its lower end takes hold of the sliding rod $d$, I prefer to make the lever $f$ in two parts, the first part, which is fastened to the link, being pivoted on the other or second part at $f^3$, and held in place therein by a notch on the first part $f^1$ taking over an edge, $f^2$, supported on the second part of the lever. When a box sticks the first part will spring a little, the edge will slip out of the notch, and the box-shifting apparatus will move without breakage and without acting upon the boxes.

Having thus described my apparatus, I claim as my own invention—

1. The combination of a lever, one end of which is connected to shuttle-boxes, with its actuating crank-pin and connecting-rod, and with another lever pivoted thereon, and the actuating crank-pin and connecting-rod thereof, whereby four shuttle-boxes may be actuated, the combination being substantially such as described.

2. The combination of a lever connected at one end with shuttle-boxes with its actuating crank-pin and connecting-rod, and with another lever pivoted thereon, and two crank-pins and two connecting-rods for actuating the same, whereby six shuttle-boxes may be operated, the combination being substantially as described.

3. A lever connected at one end with shuttle-boxes, its actuating crank-pin and connecting-rod, a second lever pivoted to the lever connected with the shuttle-boxes, and an actuating crank-pin and connecting-rod for it, in combination with two toothed wheels and two toothed surfaces, the toothed wheels turning the crank-pins, and the toothed surfaces moving the toothed wheels, the combination being substantially as herein set forth.

4. A lever connected at one end with shuttle-boxes, its actuating crank-pin and connecting-rod, and another lever pivoted thereon, and two crank-pins and two connecting-rods for actuating the same, in combination with three toothed wheels and three toothed surfaces, the combination being and operating substantially as described.

5. The combination of the two levers, a connecting-rod and crank-pin for each lever, and two toothed wheels and two toothed surfaces, with mechanism for actuating the toothed surfaces, substantially as described, the combination being substantially as herein described.

6. A lever connected at one end with shuttle-boxes, its actuating crank-pin and connecting-rod and another lever pivoted thereon, and two crank-pins and two connecting-rods for actuating the same, in combination with three toothed wheels and three toothed surfaces, and with mechanism substantially such as herein described for actuating the toothed surfaces, the combination being and operating substantially as described.

7. A lever connected at one end with shuttle-boxes, in combination with a lever pivoted thereon, the latter lever being combined with and actuated by two connecting-rods and two crank-pins, and the combination being substantially such as set forth.

8. A lever connected at one end with shuttle-boxes, in combination with a crank-pin and connecting-rod for moving the other end thereof, when said lever has a shifting or movable fulcrum, the combination being substantially such as described.

9. The contrivance herein described for obviating breakage, which is a two-part lever, one part being a spring-lever pivoted to the other part, as described, in combination with a series of shifting shuttle-boxes, substantially in the manner and for the purposes hereinbefore set forth.

HORACE WYMAN.

Witnesses:
J. B. SYME,
J. A. WARE.